United States Patent
Day

(10) Patent No.: US 7,187,935 B1
(45) Date of Patent: Mar. 6, 2007

(54) METHOD AND SOFTWARE FOR LOW BANDWIDTH PRESENCE VIA AGGREGATION AND PROFILING

(75) Inventor: Mark Day, Milton, MA (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 09/982,353

(22) Filed: Oct. 16, 2001

(51) Int. Cl.
*H04Q 7/20* (2006.01)
*H04J 11/00* (2006.01)
*H04M 7/00* (2006.01)

(52) U.S. Cl. .................. 455/456.2; 370/241; 370/210; 379/221.06

(58) Field of Classification Search .. 455/414.1–414.3, 455/456.1, 456.2, 456.3, 456.6
See application file for complete search history.

(56) References Cited

U.S. PATENT DOCUMENTS

| | | | |
|---|---|---|---|
| 5,404,355 A | 4/1995 | Raith | 370/95.1 |
| 5,519,758 A | 5/1996 | Tabbane | 379/59 |
| 5,570,412 A | 10/1996 | LeBlanc | 379/58 |
| 5,606,596 A | 2/1997 | Jain et al. | 379/59 |
| 5,649,210 A | 7/1997 | Allen | 359/750 |
| 5,659,596 A | 8/1997 | Dunn | 455/456 |
| 5,732,354 A * | 3/1998 | MacDonald | 455/456.2 |
| 5,732,383 A | 3/1998 | Foladare et al. | 701/117 |
| 5,797,097 A | 8/1998 | Roach, Jr. et al. | 455/456 |
| 5,839,076 A | 11/1998 | Becher | 455/461 |
| 5,854,758 A | 12/1998 | Kosuda et al. | 364/726.02 |
| 5,915,220 A | 6/1999 | Chelliah | 455/435 |
| 5,974,300 A | 10/1999 | LaPorta et al. | 455/31.2 |
| 6,147,601 A | 11/2000 | Sandelman et al. | 340/506 |
| 6,356,772 B1 * | 3/2002 | Choi | 455/564 |
| 6,430,604 B1 * | 8/2002 | Ogle et al. | 709/207 |
| 6,549,768 B1 * | 4/2003 | Fraccaroli | 455/456.3 |
| 6,556,823 B2 * | 4/2003 | Clapton et al. | 455/433 |
| 6,584,312 B1 * | 6/2003 | Morin et al. | 455/433 |
| 6,690,918 B2 * | 2/2004 | Evans et al. | 455/41.2 |
| 6,714,519 B2 * | 3/2004 | Luzzatti et al. | 370/252 |
| 6,757,722 B2 * | 6/2004 | Lonnfors et al. | 709/220 |
| 7,035,865 B2 * | 4/2006 | Doss et al. | 707/102 |
| 2002/0111154 A1 * | 8/2002 | Eldering et al. | 455/414 |
| 2003/0087652 A1 * | 5/2003 | Simon et al. | 455/466 |
| 2004/0142709 A1 * | 7/2004 | Coskun et al. | 455/466 |

FOREIGN PATENT DOCUMENTS

JP 10117386 A 7/1997

OTHER PUBLICATIONS

Request for Comments: 2778, "A Model for Presence and Instant Messaging", available at http://www.rfc-editor.org/rfc/rfc2778.txt (15 pgs).

* cited by examiner

*Primary Examiner*—Fan Tsang
*Assistant Examiner*—Joseph T Phan
(74) *Attorney, Agent, or Firm*—Dreier LLP

(57) ABSTRACT

A method and software for determining the presence status of a client device while decreasing the use of available bandwidth used. A software module collects a client's presence status, optionally over one or more time periods. The collected presence status is combined to create an observed presence profile for a client. The observed presence profile is compared with one or more model presence profiles to determine the model presence profile that is the closest match to the observed presence profile. When the closest match is determined, a status code representing the model profile is transmitted to a requesting client device, obviating the need to transmit a plurality of presence status updates.

16 Claims, 4 Drawing Sheets

| | Presence Profile | Status Code | Interpretation | |
|---|---|---|---|---|
| 302 | Steady active | 1 | "Active" | 302b |
| 304 | Steady inactive | 2 | "Inactive" | 304b |
| 306 | Just gone active | 3 | "Stepped in" | 306b |
| 308 | Just gone inactive | 4 | "Stepped out" | 308b |
| 310 | Steady active to steady inactive | 5 | "Departed" | 310b |
| 312 | Steady inactive to steady active | 6 | "Arrived" | 312b |
| 314 | Steady active with brief inactive | 7 | "Stepped out, back again" | 314b |
| 316 | Steady inactive with brief active | 8 | "Stepped in, away again" | 316b |
| 318 | Mixed | 9 | "In and out" | 318b |

| Presence Profile | Status Code | Interpretation |
|---|---|---|
| Steady active | 1 — 302a | "Active" — 302b |
| Steady inactive | 2 — 304a | "Inactive" — 304b |
| Just gone active | 3 — 306a | "Stepped in" — 306b |
| Just gone inactive | 4 — 308a | "Stepped out" — 308b |
| Steady active to steady inactive | 5 — 310a | "Departed" — 310b |
| Steady inactive to steady active | 6 — 312a | "Arrived" — 312b |
| Steady active with brief inactive | 7 — 314a | "Stepped out, back again" — 314b |
| Steady inactive with brief active | 8 — 316a | "Stepped in, away again" — 316b |
| Mixed | 9 — 318a | "In and out" — 318b |

Fig. 3

METHOD AND SOFTWARE FOR LOW BANDWIDTH PRESENCE VIA AGGREGATION AND PROFILING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to communication between mobile devices over wireless networks. More particularly, the present invention relates to a system and software for determining a mobile device's presence status in a network or real-time collaboration application.

Presence systems involve an entity distributing information to other devices on a network or participating on a collaborative application regarding the status of the principal controlling the entity. Specifically, presence information concerns: where the principal controlling the entity is, what they are doing, or if they may be reached. Presence information can be summarized as possessing three general characteristics: it may change frequently, it may be of interest to a large number of parties, and it should be disseminated rapidly to those parties of interest. A model for presence systems and their application to instant messaging technology is presented in RFC 2778, entitled "A Model for Presence and Instant Messaging" and available at www.rfc-editor.org/rfc/rfc2778.txt, which is hereby incorporated by reference in its entirety.

An exemplary real-time collaboration application is Sametime version 2.0 from Lotus Development Corp. The core of the Sametime application is a secure instant messaging (IM) architecture, which safely keeps IM traffic within an organizational LAN or encrypted while passing over the Internet to remote users. The real-time collaboration aspect of the application goes beyond instant messaging, providing multiparty audio and video conferencing, screen sharing which allows a plurality of users to simultaneously edit a document, and a set of APIs that allow webmasters to add messaging functions to web pages. Importantly, the application tracks each user's status or presence information, allowing the system to determine if a particular user or device is available for transmission or receipt of information.

Problems that arise with the implementation of presence systems may be thought of as the intersection of the following elements: the frequency of the updates, the size of the updates, the number of subscribers receiving updates, and the cost of transmitting an update to a subscriber. In a typical implementation on a personal computer connected to a wired network, transport costs are relatively low and therefore allow for all presence changes to be simply propagated directly to all interested parties. There are situations, however, where this sort of brute force transmission of updates is impossible or undesirable. For example, in wireless networks, as will be explained herein in greater detail, taking this approach is prohibitively expensive. Thus, techniques are needed to effectively replace multiple frequent "low-level" updates with fewer "high-level" updates.

Status checking or "presence" technology is an important component of distributed and collaborative applications that allow multiple users to interact and share resources in real-time. As the presence status of each client connected to the system changes, all connected clients must be continuously broadcast presence status updates regarding the status change of every other device. Unfortunately, the resources consumed by these transmissions are a serious concern where bandwidth is scarce or expensive. Presence systems, and the network infrastructure required to support them, can significantly increase costs while degrading network and application performance.

An awareness or presence system similar to those employed by real-time collaboration applications can generate updates and notifications every few seconds as the status of each client device changes. Indeed, a client's status can change many times every second under certain circumstances, e.g., where the entity is not a person but another type of entity such as a computer system. Brute force techniques like the ones discussed above for delivering presence information are viable, indeed desirable, when the requesting and target devices are communicating over an inexpensive network, e.g., broadband wired network. By exploiting the ability to continuously transmit presence data, other devices can be assured that the presence status of a target device is constantly fresh.

Bandwidth in present day wireless networks, however, is in limited supply. In many of these wireless networks, there are nontrivial charges per message or even per byte. On such networks, methods are needed to deliver a form of presence information to other devices on a network or collaborating on an application without requiring a multiplicity of messages being passed between devices. By reducing the number of status messages passed over the network, unnecessary bandwidth utilization is reduced for the presence system as well as the total bandwidth required by any application accessing the network.

Some solutions have been developed to improve the efficiency with which resources are used in networks with high bandwidth costs or limited bandwidth infrastructure. One such example is U.S. Pat. No. 5,915,220, entitled "System and Method for Maintaining Profile Information in a Telecommunications Network". This patent discusses transmitting a user's profile information to a mobile switching center currently providing an access point for the user only when the profile information is updated, thereby reducing bandwidth requirements. Another solution, U.S. Pat. No. 5,519,758, entitled "Radiotelephonic Process for Locating Mobile Subscribers and a Radiotelephone Installation for Implementing the Process", discusses generating a profile regarding the movements of a mobile user. In response to an incoming communication request, the recorded location zone from the profile with the highest probability of containing the user is selected. In the event the device is not in the zone selected, the zone with the next highest probability of containing the user is selected, and so on until the device is located. These systems, however, neither teach nor suggest systems or methods for transmitting presence status updates to other clients in a distributed or collaborative environment.

Thus, a technique is needed for improving the efficiency with which presence status updates are transmitted to other clients in distributed and collaborative environments. There is a further need for reducing the bandwidth used to communicate such updates.

BRIEF SUMMARY OF THE INVENTION

The present invention provides a method and software for reducing the frequency with which presence status information needs to be sent to mobile clients requesting presence information over a low-bandwidth or high-cost connection.

The method and software determines a mobile user's presence status on a network by periodically or randomly sampling a user's presence status over one or more periods of time to create an observed presence profile, which is then used to derive assumptions regarding a user's presence status. Characterizing the solution in a slightly different manner, the invention shifts transmitted updates from the "raw" received updates to "higher level" updates that are inferred through profile matching.

The present invention also provides presence status information to clients utilizing real-time collaboration software, or other real-time applications, which require clients or participants to be aware of the presence status of other clients participating in the real-time process. The invention achieves this while significantly reducing the bandwidth requirements for transmitting these notifications.

An application server executing a real-time collaborative environment, application, or application suite, receives presence status notifications from all clients participating in the real-time collaborative process. Aggregation software running on a server computer, e.g., the application server, receives these notifications for each client device connected to the server and accumulates them over a period of time. The aggregation software may further index these notifications by client, e.g., by a unique client identifier or client network address. Alternatively, clients may request presence information directly from each other and distribute the updates directly. A software process executing on one of the clients performs the aggregation for clients that have limited bandwidth or bandwidth cost restraints. The aggregate set of notification data is referred to as the client's observed presence profile, which represents a high-level description of the user's behavior over a period of time.

The observed presence profile is compared against a collection of model presence profiles. A model presence profile represents an intuitive notion of a device's activities as manifested by its observed presence information. A software mechanism, referred to as a "distiller", applies one of any number of signal processing techniques, such as a Fast Fourier Transformation or FFT, to match the observed profile with the closest or most similar model profile. Each model profile, which is a representation of the user's approximate behavior over a period of time, is associated with a status code. The resulting status code is delivered to the client. The requesting client's presence software, in turn, interprets the code to determine a target device's presence status, optionally through the use of a lookup table.

For "push" type services, generally referred to as the delivery of information that is initiated by the information server rather than by the information user or client, the distiller periodically computes the appropriate status code to send to the wireless device. For example, the server might retain the last hour's worth of notifications from the target device and recompute the status every five minutes. For "pull" services, generally referred to as the delivery of information that is initiated by the information user or client rather than by the information server, the distiller may similarly retain the previous hour's worth of notifications from the target device. Contrasting with a push system, in a pull system the distiller would only need to recompute the status code when requested by a client device, e.g., on demand.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is a diagram presenting a table containing the correlation between model presence profiles and status codes according to one embodiment of the present invention.

DETAILED DESCRIPTION OF THE PREFERRED EMBODIMENTS

Figure 1:
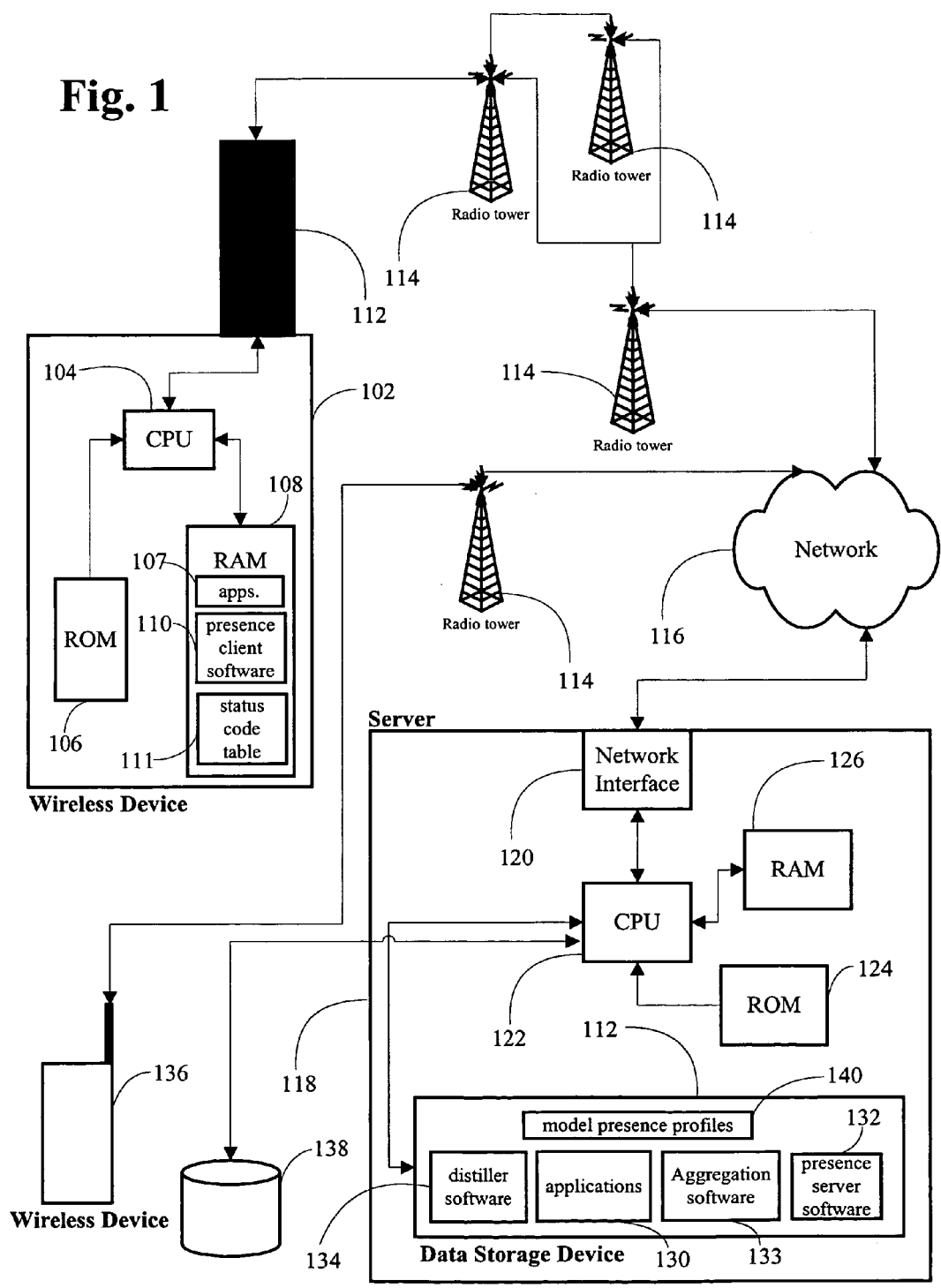
FIG. 1 is a block diagram presenting the components of a system for providing presence information while reducing bandwidth utilization according to one embodiment of the present invention.

FIG. 1 presents one embodiment of a system employing the method and software of the present invention. A wireless device 102 is used to store and execute applications designed to work in a wireless network environment. The wireless device 102 is comprised of a programmable digital microprocessor ("CPU") 104, which reads program code instructions stored in ROM 106 and RAM 108. Typically, the device's operating system ("OS"), the program code controlling the various hardware and software components of the device, are stored in ROM 106 so as to minimize the chances of corrupting or overwriting OS code. Alternatively, the OS code can reside in RAM 108 or other data storage device (not pictured).

The wireless device's RAM 108 stores application program code for execution by the CPU 104. RAM 108 stores a variety of applications 107 for communication, productivity, etc. The wireless device 102 may also be executing distributed or real-time collaboration applications through communication with servers 118 and other wireless devices 136 connected to a network 116.

In order for these distributed applications to work, a central server 118 facilitating communication between the clients 102 and 136 must receive regular updates regarding the presence status of each participating client. A wireless device 102, therefore, must store and execute presence client software 110 that sends periodic presence status updates to a server 118. Alternatively, the presence software 110 is integrated within another application program.

A wireless device 102 transmits data using an integral antenna 112 embodying a transmitter, which is typically capable of sending and receiving information via radio waves. Alternatively, the wireless device 102 can use any suitable wireless communication method including, but not limited to, infrared, microwave, or satellite. Signals are transmitted from the antenna and received by the nearest radio tower 114 or other wireless receiver. The received signal is propagated through a wireless network, e.g., towers 114, until it is passed to a wired network 116 through a gateway (not pictured).

A server computer 118 is connected to the network 116 and receives data via a network interface 120. The server 118 further comprises a CPU 122, ROM 124, RAM 126, and a data storage device 112. The data storage device 112 stores applications 130 and program code necessary for the operation of the server, e.g., the operating system. The data storage device further stores presence server software 132, which receives presence status updates from client devices. A data structure is created for each client registered with the system (not pictured). As updates are received, the aggregation software 133 associates and stores the update with the proper data structure representing the client device. Alternatively, a database 138 can be used whereby each registered client has a unique record in the database that is used to store presence status updates as they are indexed by the aggregation software 133.

The data storage device 112 also stores distiller software 134. The distiller software 134 examines the presence status of a client, collected and stored by the aggregation software 133, over a discrete time period to create an observed presence profile. The observed presence profile is compared with a collection of model presence profiles 140, each of which represents an intuitive notion of a user's activities as manifested by their observed presence information. Through the use of a signal processing technique, such as a Fast Fourier Transformation, the closest matching profile 140 is selected. A system and method for performing a Fast Fourier Transformation is disclosed in U.S. Pat. No. 5,854,758, entitled "Fast Fourier Transformation Computing Unit and a Fast Fourier Transformation Computation Device" and issued on Dec. 29, 1998, the disclosure of which is hereby incorporated by reference in its entirety.

A code associated with the model profile is selected, which is a representation of a device's current status, and transmitted across a network 116 and 114 to other clients 136 participating in a distributed or collaborative application 130 being executed on the server 118. Each device receives the code and derives its meaning through the use of a status code lookup table 111. In this manner, requesting clients can determine the presence status of target clients without having to unnecessarily use bandwidth to determine other client's instantaneous status, which is of limited utility when the status of a device is frequently changing on a slow or low bandwidth network.

Figure 2:
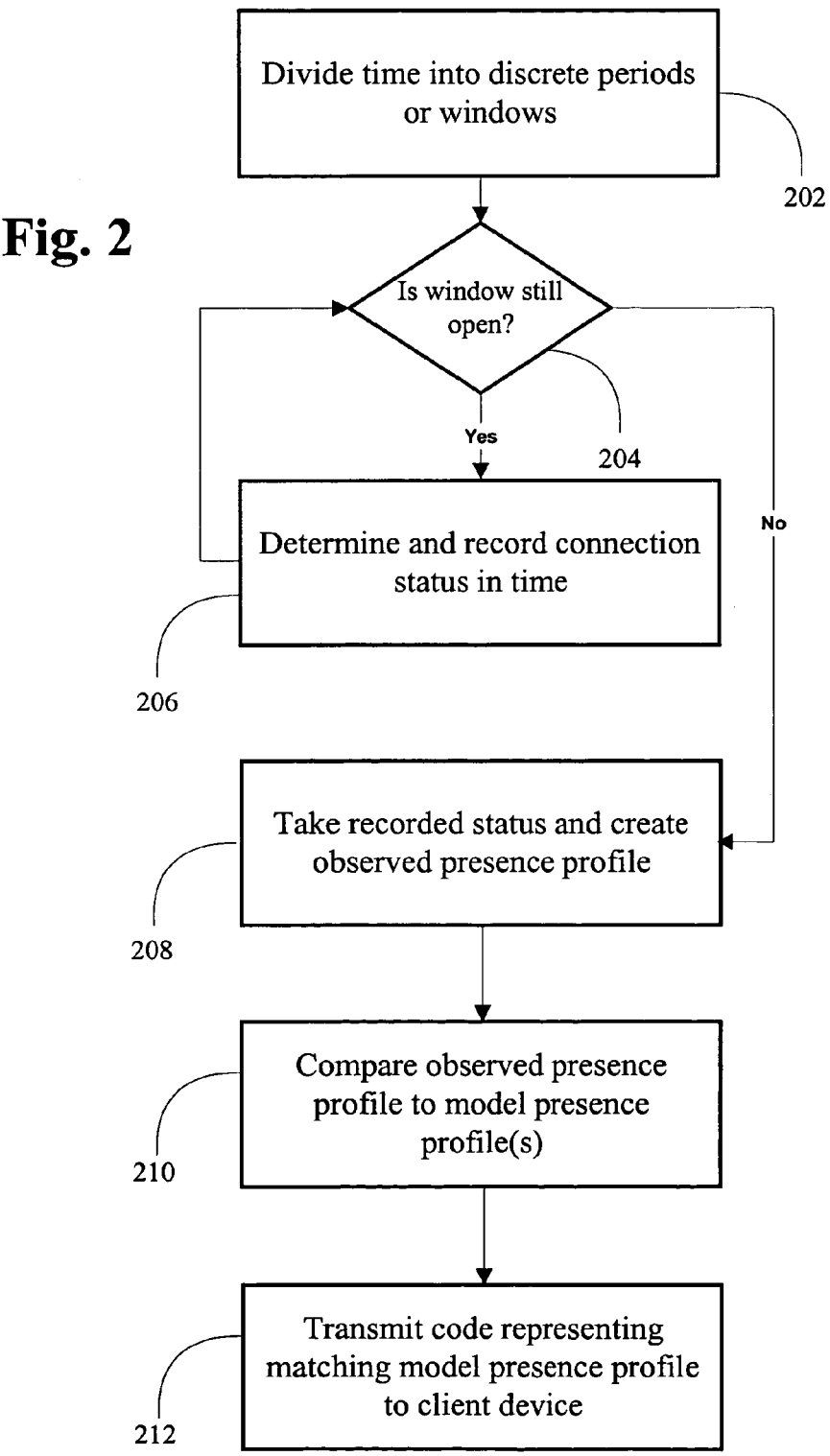
FIG. 2 is a flow diagram presenting the overall process of collecting profile data and deriving a status code according to one embodiment of the present invention.

Turning to FIG. 2, a flow diagram of a process executed by the above described software components is presented. The software divides a block of time into a discrete time period or window 202. According to one embodiment, the software computes the window as a thirty (30) minute block of time, although time windows of longer or shorter duration are contemplated by the invention. While the time window is still open 204, the software communicates with clients participating in a collaborative or real-time environment to collect each device's presence status 206. For example, where the collection window is an hour, the software monitors and collects a specific device's presence status for the one-hour period.

The collection window closes 204 and the recorded presence status is combined into an observed presence profile 208. Alternatively, presence status updates can be stored in a database or discrete data structure as they are collected to generate an evolving observed presence profile. Indeed, the observed presence profile may be any data set that accurately depicts a user's activities over a period of time. In its simplest form, the profile may be depicted in terms of a two-state system of active/inactive. According to one embodiment, the observed presence profile is a data set comprising a series of bits representing a user's status of activity or inactivity over a period of time. Depending on the frequency of active or inactive bits comprising the profile, a particular presence profile is compiled.

An observed presence profile is derived from the observed presence status over a period of time and is compared against a model preference profile 210. In most instances, it is useful to develop a plurality or library of model presence profiles, each model profile representing a presumed presence status based on a different set of assumptions, e.g., each based on a different set of observed connection states. The process of comparing an observed and model presence profile can be accomplished using any number of pattern matching techniques, such as a signal processing algorithm. One such technique would be to apply a Fast Fourier Transformation (FFT) to the observed presence profile to determine the model profile that most closely matches the observed profile.

Each model presence profile has a unique status code associated with it. Once the model profile that most closely matches the observed profile is derived 210, the software references or retrieves the model presence profile's status code. This status code is transmitted to all requesting clients or all clients participating in a real-time collaborative environment that need to be aware of other client's presence status 212. Each client is capable of receiving the status code and acting upon it as is necessary according to the particular application utilizing the code.

Figure 4:
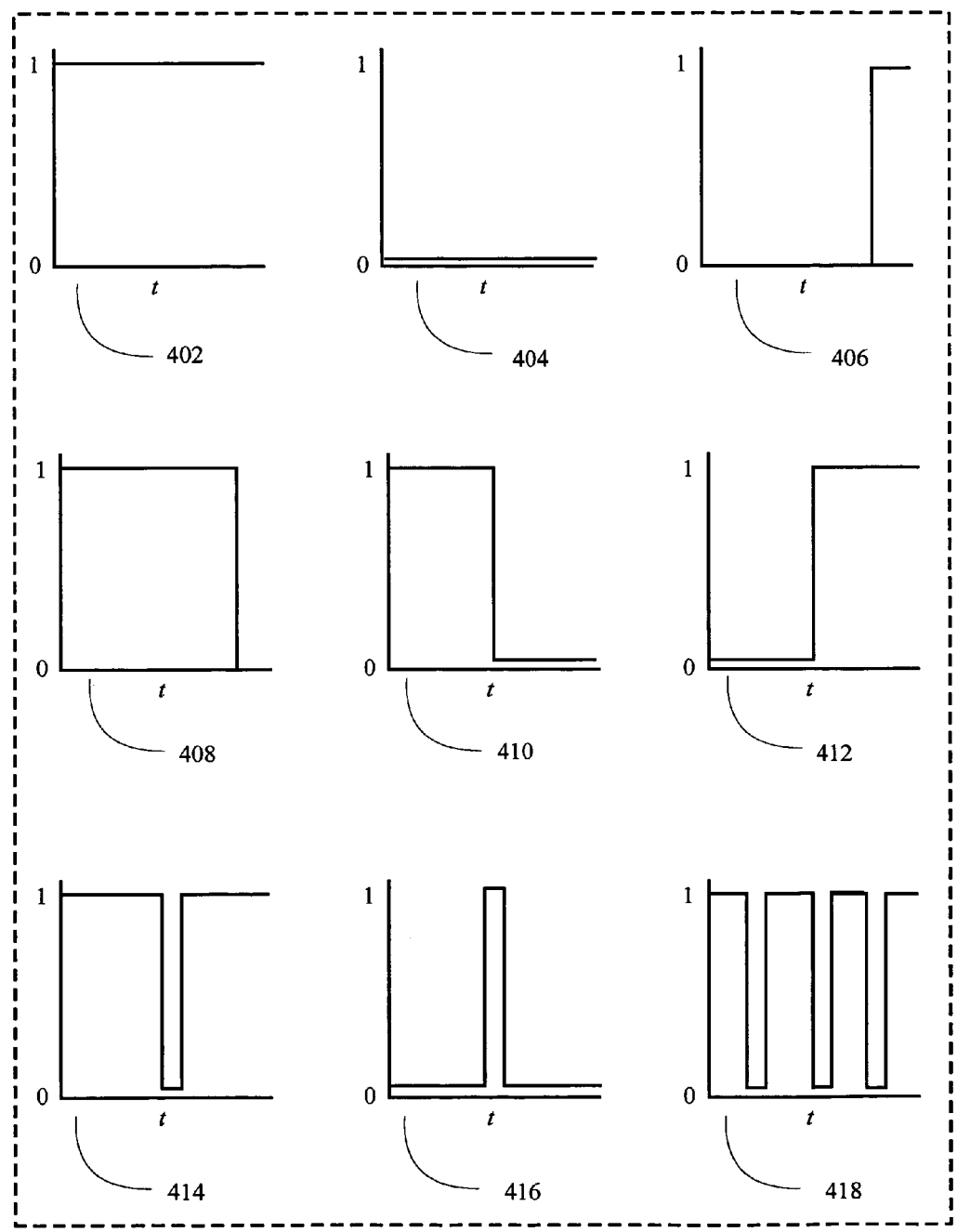
FIG. 4 illustrates a series of graphs that represent a user's activity as a function of time for each of the model presence profiles in accordance with embodiements of the invention.

Turning to FIGS. 3 and 4, FIG. 3 presents a table comprising an exemplary correlation between model presence profiles and status codes, whereas FIG. 4 presents a series of graphs that represent a user's activity as a function of time for each of the model presence profiles. The table 300, which may be stored as a data structure local to or remote from the server workstation executing the other software components, comprises a listing of each model presence profile maintained by the server, 302 through 318. Each of the model presence profiles, 302, 304, 306, 308, 310, 312, 314, 316, and 318, is correlated or associated with a status code, 302*a*, 304*a*, 306*a*, 308*a*, 310*a*, 312*a*, 314*a*, 316*a*, and 318*a*, as well as an exemplary interpretation that may be conveyed to the user 302*b*, 304*b*, 306*b*, 308*b*, 310*b*, 312*b*, 314*b*, 316*b*, and 318*b*. FIG. 4 presents the set of activities 402, 404, 406, 408, 410, 412, 414, 416, 418 that are respectively associated with each of the presence profiles.

As explained above, the model presence profile that most closely matches the observed presence profile is determined, e.g., through the use of a Fast Fourier Transformation. The table 300 is used to determine the status code associated with the derived closest matching model presence profile. For example, where the system determines that the model presence profile that most closely matches the observed presence profile is "Steady active to steady inactive" 310 and 410, the system determines the associated status code, in this example the associated status code being "5" 310*a*. Similarly, where the system determines that the model profile that most closely matches the observed presence profile is "Mixed" 318 and 418, the system extracts the associated status code "9" 318*a*.

The status code is transmitted to a client device that also uses the table to determine the meaning or interpretation of the received status code. For example, a status code of "5" 310*a* would be interpreted as "Departed" 310*b*. Alternatively, the table may be divided whereby a server device contains a table comprising presence profiles and status codes, while a client device contains a table comprising status codes and interpretations. The client device may access any of the above-described tables or data structures either locally or remotely.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for informing remote clients as to the presence status of a device, the method comprising:

recording a presence status of a first device to create an observed presence profile that comprises information regarding the presence status of the device over a period of time;

comparing the observed presence profile with one or more model presence profiles that represent an approximation of the presence status of the device to compute a closest matching model presence profile;

transmitting a status code representing the closest matching model presence profile to one or more devices; and interpreting the status code to determine the presence status of the device.

2. The method of claim 1, the method comprising:

dividing a block of time into one or more discrete time periods;

recording the first device's presence status over the one or more discrete time periods; and creating an observed presence profile from the first device's recorded presence status.

3. The method of claim 1 comprising comparing the observed presence profile with the model presence profiles when requested by the one or more devices.

4. The method of claim 1 comprising comparing the observed presence profile with the model presence profiles according to a schedule.

5. The method of claim 1 wherein the step of transmitting is executed when requested by the one or more devices.

6. The method of claim 1 wherein the step of transmitting is executed according to a schedule.

7. The method of claim 1 comprising applying a pattern detection algorithm to compare the observed presence profile with one or more model profiles to compute the closest matching model presence profile.

8. The method of claim 7 comprising applying a Fast Fourier Transformation to compare the observed presence profile with one or more model profiles to compute the closest matching model presence profile.

9. Computer readable media comprising program code, the program code instructing a programmable computer to execute a method for informing remote clients as to the presence status of a device, the method comprising:

recording a presence status of a first device to create an observed presence profile that comprises information regarding the presence status of the device over a period of time;

comparing the observed presence profile with one or more model presence profiles that represent an approximation of the presence status of the device to compute the closest matching model presence profile;

transmitting a status code representing the closest matching model presence profile to one or more devices; and interpreting the status code to determine the presence status of the device.

10. The program code claim 9 instructing a programmable computer to execute a method for informing remote clients as to the presence status of a device, the method comprising:

dividing a block of time into one or more discrete time periods;

recording the first device's presence status over the one or more discrete time periods; and creating an observed presence profile from the first device's recorded presence status.

11. The program code of claim 9 instructing a programmable computer to execute a method for informing remote clients as to the presence status of a device, the method comprising comparing the observed presence profile with the model presence profile when requested by the one or more devices.

12. The program code of claim 9 instructing a programmable computer to execute a method for informing remote clients as to the presence status of a device, the method comprising comparing the observed presence profile with the model presence profiles according to a schedule.

13. The program code of claim 9 instructing a programmable computer to execute a method for informing remote clients as to the presence status of a device, wherein the step of transmitting is executed when requested by the one or more devices.

14. The program code of claim 9 instructing a programmable computer to execute a method for informing remote clients as to the presence status of a device, wherein the step of transmitting is executed according to a schedule.

15. The program code of claim 9 instructing a programmable computer to execute a method for informing remote clients as to the presence status of a device, the method comprising applying a pattern detection algorithm to compare the observed presence profile with one or more model profiles to compute the closest matching model presence profile.

16. The program code of claim 15 instructing a programmable computer to execute a method for informing remote clients as to the presence status of a device, the method comprising applying a Fast Fourier Transformation to compare the observed presence profile with one or more model profiles to compute the closest matching model presence profile.

* * * * *